United States Patent
Sfar

(10) Patent No.: US 9,629,056 B2
(45) Date of Patent: Apr. 18, 2017

(54) METHOD OF CONTROLLING HANDOVER BY USER EQUIPMENT

(71) Applicant: Optis Circuit Technology, LLC, Plano, TX (US)

(72) Inventor: Safouane Sfar, Nuremberg (DE)

(73) Assignee: Optis Circuit Technology, LLC, Plano, TX (US)

( * ) Notice: Subject to any disclaimer, the term of this patent is extended or adjusted under 35 U.S.C. 154(b) by 164 days.

(21) Appl. No.: 14/361,092

(22) PCT Filed: Dec. 12, 2012

(86) PCT No.: PCT/EP2012/075285
§ 371 (c)(1),
(2) Date: May 28, 2014

(87) PCT Pub. No.: WO2013/087721
PCT Pub. Date: Jun. 20, 2013

(65) Prior Publication Data
US 2014/0349656 A1    Nov. 27, 2014

Related U.S. Application Data

(60) Provisional application No. 61/582,935, filed on Jan. 4, 2012.

(30) Foreign Application Priority Data

Dec. 15, 2011    (EP) ................................ 11306666

(51) Int. Cl.
*H04W 36/36*    (2009.01)
*H04W 36/00*    (2009.01)

(52) U.S. Cl.
CPC ....... *H04W 36/36* (2013.01); *H04W 36/0088* (2013.01)

(58) Field of Classification Search
CPC . H04W 36/30; H04W 36/0083; H04W 88/08; H04W 24/02; H04W 36/08;
(Continued)

(56) References Cited

U.S. PATENT DOCUMENTS

2006/0258386 A1* 11/2006 Jeong .................... H04W 36/24
    455/525
2009/0137240 A1* 5/2009 Dillon ................... H04W 36/30
    455/423
(Continued)

FOREIGN PATENT DOCUMENTS

EP    2 385 725 A1    11/2011
SE    WO 2010053425 A2 *    5/2010 ............ H04W 36/30
(Continued)

OTHER PUBLICATIONS

Extended European Search Report issued in corresponding European application No. EP 11 30 6666, date of completion Feb. 20, 2012.

(Continued)

*Primary Examiner* — George Eng
*Assistant Examiner* — Jing Gao
(74) *Attorney, Agent, or Firm* — Spencer C. Patterson; Grable Martin Fulton PLLC

(57) ABSTRACT

A user equipment performs a method for evaluating a need for handover between cells in a cellular network. The method includes estimating the risk of making an ineffective handover, and, when said estimated risk is above a threshold, changing the value of at least one handover trigger parameter so as to reduce the future risk of ineffective handover.

18 Claims, 4 Drawing Sheets

(58) Field of Classification Search
CPC . H04W 36/32; H04W 88/06; H04W 36/0088; H04W 36/22; H04W 36/14; H04W 36/00; H04W 76/046; H04W 84/045; H04W 88/02; H04W 28/0215; H04W 36/0094
USPC .......................................................... 455/437
See application file for complete search history.

(56) References Cited

U.S. PATENT DOCUMENTS

| | | | |
|---|---|---|---|
| 2010/0173626 A1 | 7/2010 | Catovic et al. | |
| 2010/0273487 A1* | 10/2010 | Alonso-Rubio | H04W 36/385 455/436 |
| 2011/0086635 A1* | 4/2011 | Grob-Lipski | H04W 36/32 455/423 |
| 2013/0065632 A1* | 3/2013 | Macias | H04W 36/0083 455/525 |

FOREIGN PATENT DOCUMENTS

| | | |
|---|---|---|
| WO | 2010/053425 A2 | 5/2010 |
| WO | 2010/104446 A1 | 9/2010 |

OTHER PUBLICATIONS

International Search Report issued in corresponding International application No. PCT/EP2012/075285, date of mailing Jan. 15, 2013.
Written Opinion of the International Searching Authority issued in corresponding International application No. PCT/EP2012/075285, date of mailing Jan. 15, 2013.
Office Action in corresponding European Application No. EP 11 306 666.6, dated Feb. 11, 2014.
Office Action in corresponding European Application No. EP 11 306 666.6, dated May 23, 2016.

* cited by examiner

METHOD OF CONTROLLING HANDOVER BY USER EQUIPMENT

TECHNICAL FIELD

The invention relates to methods of controlling handover in a cellular network.

BACKGROUND

Handover is one of the procedures for ensuring that the users move freely through the network while still being connected and being offered high quality services. Since its success rate is an indicator of user satisfaction, it is interesting that this procedure happens as fast and as seamlessly as possible.

According to a first prior art, the handover procedure is completely managed by the network.

According to a second prior art—Self Optimization Network (SON) specifications for Long Term Evolution (LTE) network—intelligence should be introduced in the user equipment. Such intelligence might, for example, enable the user equipment to improve handover trigger parameters. A typical aim of such intelligence might be to get a better quality of service (QoS) related to telecom services.

According to a third prior art, for example described in WO 2010/104446 (page 14 lines 1-7), the user equipment also determines a condition that affects the radio communication between the user equipment the user equipment and the network, and in response to that condition, the Time To Trigger (TTT) value is reduced so that the reportable event is reported to the network sooner, e.g., before the call connection is dropped.

SUMMARY

Embodiments of the invention aim at avoiding or reducing, for a given user equipment, the number of ineffective handovers. Even more particularly, when the handover failure rate and/or the ping pong handover rate become too high, embodiments of the invention aim to avoid ping pong handovers and/or handover attempts likely to fail. This way, some ineffective handovers, which are time consuming and energy consuming, are avoided.

According to some embodiments of the invention, once an ineffective handover rate for a given user equipment becomes too high, one or more handover trigger parameters are adjusted (e.g. increased) so that the conditions for handover trigger are made harder to fulfill so that a future risk of an ineffective handover by the user equipment is reduced from then on. This way, when a handover is then performed for this given user equipment, the probability that this handover becomes ineffective, for example fails or results in a ping pong handover, is lower than the former probability with not yet adjusted (e.g. increased) handover trigger parameters. This way, the favorable conditions, for example a high received power, which render a target cell more attractive for a handover for this given user equipment, may be checked for a longer period of time in some embodiments. This might lower the probability that they vanish just before or just after the next handover.

The ineffective handover rate may be either an ineffective handover rate between two given cells or a global ineffective handover rate whatever are the present and target cells considered.

According to some embodiments of the invention, user equipment can help on handover procedure optimization as well as on enhancing the Quality of Service. The proposed handover optimization algorithm implemented in a user equipment side, may change the values of the Power Hysteresis and/or the Time To Trigger handover trigger parameters as specified in 3GPP specifications in an automated manner in order to lower handover failure rate and/or ping pong handover rate for this user equipment.

This and other objects may be achieved with a method of a user equipment controlling handover between cells in a cellular network, comprising: a step of estimating a risk of an ineffective handover, when said estimated risk is above a threshold, a step of changing a value of at least one handover trigger parameter to reduce a future risk of an ineffective handover by the user equipment.

This and other objects may also be achieved with a method of a user equipment controlling handover from a given present cell to a given target cell in a cellular network, comprising: a step of estimating a risk of an ineffective handover from said present cell to said target cell, when said estimated risk is above a threshold, a step of changing a value of at least one handover trigger parameter to reduce a future risk of an ineffective handover by the user equipment.

Preferred embodiments comprise one or more of the following features:

said estimating step includes a substep of counting the number of ineffective handovers and a substep of comparing said counted number to a threshold.

ineffective handover is a failed handover or ineffective handover is a ping pong handover.

in said changing step, at least one said handover trigger parameter is increased.

at least one said handover trigger parameter is received from cellular network before being changed.

said changing step includes a first substep of changing the value of the Time To Trigger parameter, and if said first substep does not lead to a next effective handover, a second substep of changing the value of the handover Power Hysteresis, and if said second substep does not lead to a next effective handover, a third substep of changing both the values of the Time To Trigger parameter and of the handover Power Hysteresis parameter.

said controlling method also comprises: a step of Quality of Service estimation for a cell which is a target cell for handover, when said estimated Quality of Service such as the throughput is above a threshold, a step of changing, preferably decreasing, the value of at least one handover trigger parameter of user equipment so as to accelerate the handover to this target cell.

said controlling method also comprises: a step of Quality of Service, such as the throughput, estimation for a cell which is a target cell for handover and for a cell which is a serving cell, when difference between said estimated Quality of Service for said target cell and said estimated Quality of Service for said serving cell is above a threshold, a step of changing, preferably decreasing, the value of at least one handover trigger parameter of user equipment so as to accelerate the handover to this target cell.

a computer program product comprising a computer readable medium, having thereon a computer program comprising program instructions, the computer program being loadable into a data-processing unit and adapted to cause execution of the method according to embodiments of the invention when the computer program is run by the data-processing unit.

This and other objects may also be achieved with an arrangement for a user equipment of a cellular network, comprising: a memory adapted to store at least one handover trigger parameter, an estimator adapted to estimate a risk of a failed handover and/or a risk of making a ping pong handover, a processor adapted, when said estimated risk or at least one of said estimated risks is above a threshold, to trigger in said memory a change, preferably an increase, of a value of said stored handover trigger parameter.

Preferred embodiments comprise one or more of the following features:

said estimator comprises: at least one counter adapted to count, since last effective handover, number of past failed handovers and/or number of past ping pong handovers, a comparator adapted to compare said number to a threshold, said risk being above said threshold if said number is above said threshold and said risk being below said threshold if said number is below said threshold.

the estimator is also adapted to estimate a Quality of Service, such as the throughput, for a cell which is a target cell for handover, the processor is also adapted, when said estimated Quality of Service is above a threshold, to trigger in said memory a change, preferably a decrease, of the value of said stored handover trigger parameter so as to accelerate the handover to this target cell.

This and other objects may also be achieved with an arrangement for a user equipment of a cellular network, comprising: a memory adapted to store a handover trigger parameter which is a Power Hysteresis, an estimator adapted to estimate a variation of a handover measurement parameter between said user equipment and the base station of at least a cell, a processor adapted to trigger, in said memory, a change of the value of said Power Hysteresis, when said estimated variation is above a threshold.

This and other objects may also be achieved with a communication device comprising the arrangement according to embodiments of the invention.

According to some embodiments of the invention, the future risk of an ineffective handover by the user equipment is the future rate of handover to be made by the user equipment, for given handover attractiveness parameters respectively received from base stations of cells. Preferably, these handover attractiveness parameters may be the power levels, received by the user equipment during a specific time interval, respectively coming from said base stations of said cells. This handover attractiveness parameters may be the Quality of Service, received by the user equipment during a specific time interval, respectively coming from said base stations of said cells.

According to some embodiments of the invention, at least one changed handover trigger parameter is the Time To Trigger parameter and/or the handover Power Hysteresis.

According to some embodiments of the invention, the threshold to which the estimated risk is compared is a predetermined threshold. According to some embodiments of the invention, the threshold to which the counted number of ineffective past handovers is compared is a predetermined threshold.

According to some embodiments of the invention, ineffective handover includes one or more categories of ineffective handovers. According to some embodiments of the invention, different risks of making an ineffective handover are respectively estimated for different categories of ineffective handovers in a separate and independent way from one another.

According to some embodiments of the invention, the handover measurement parameter is a parameter that can be determined by the user equipment alone, preferably because it can be deduced by the user equipment from the communication between said user equipment and base stations of cells, without being given by base stations of cells. The parameter may, for example, be the success rate of handover, the number of ping pong handovers, and/or the quality of service of the communication.

According to some embodiments of the invention, there is a user equipment comprising an arrangement for a user equipment according to some embodiments of the invention.

Further features and advantages of embodiments of the invention will appear from the following description of embodiments of the invention, given as non-limiting examples, with reference to the accompanying drawings listed hereunder.

DETAILED DESCRIPTION

Figure 1:
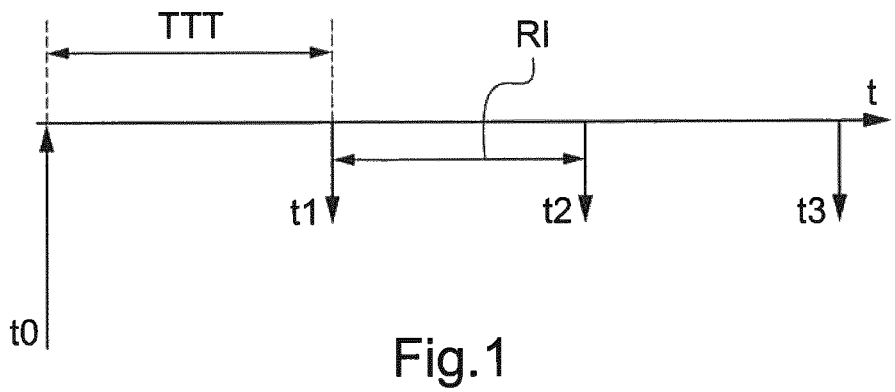
FIG. 1 and FIG. 2 show how the handover trigger parameters, Time To Trigger and Power Hysteresis, are used by a user equipment in a cellular network.
Figure 2:
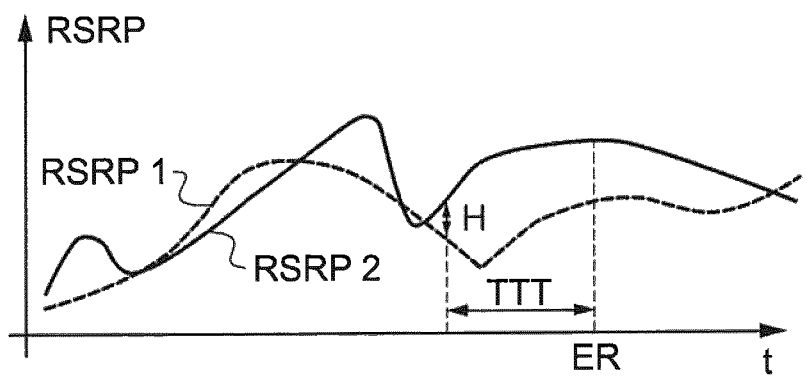

FIG. 1 and FIG. 2 show how the handover trigger parameters, Time To Trigger (TTT) and Power Hysteresis (H), are used by a user equipment in a cellular network. On FIG. 1, an axis of time t is shown. On this axis of time t, there are four moments, t0, t1, t2, t3 and two time intervals TTT and RI. At time t0, a condition to be reported is met; it is for example the high power level received by user equipment, from a base station of a target cell to be compared to e.g. a notably lower power level received from a base station of present cell of the user equipment, which makes this target cell attractive for a handover for this user equipment. The user equipment checks that the condition is met during the TTT time interval, and then sends the report to the network at time t1. If this favorable condition for handover remains met for another RI time interval which is the report interval, the user equipment sends a report again at time t2, and again at time t3 if this favorable condition for handover remains met for another RI time interval. There may be a maximum number of report sendings or reports may be continuously sent until this favorable condition for handover is no more met.

On FIG. 2, this way of working is explained in more detail. The condition of FIG. 1 is met when the difference between two Reference Signal Received Powers (RSRP) is above a threshold H which is the Power Hysteresis. The Reference Signal Received Power RSRP1 of base station of present cell of a user equipment is shown with respect to time t. The Reference Signal Received Power RSRP2 of a base station of a target cell for handover of a user equipment is also shown with respect to time t. When the difference between RSRP2 and RSRP1 gets above threshold H, then the time interval TTT begins to run. If the difference between RSRP2 and RSRP1 stays above threshold H during the time interval TTT, then there is an Event Report (ER), which means that user equipment sends a report to network, to a base station of serving cell of cellular network indeed, in which it says that target cell is attractive for handover, that is there is a favorable condition for performing handover from present cell to target cell. The handover of the user equipment will then be triggered on the basis of the handover trigger parameters which are defined by the network. The two main trigger parameters are the Power Hysteresis H, and the Time To Trigger TTT. This handover will be triggered when there is a favorable condition for handover, for example when the RSRP value from a base station of an adjacent cell, the target cell, is higher than the one from a base station of the serving cell, present cell, by a power level at least equal to Power Hysteresis H. This favorable condition has to be satisfied for a time period at least equal to the time interval TTT. The user equipment may be configured to send a report to the network only on some event occurrence; that is, for example, when the power received from a base station of the present cell is going below a given threshold. Typically, an action is triggered in the network as soon as the measurement report is received from the user equipment.

Figure 3:
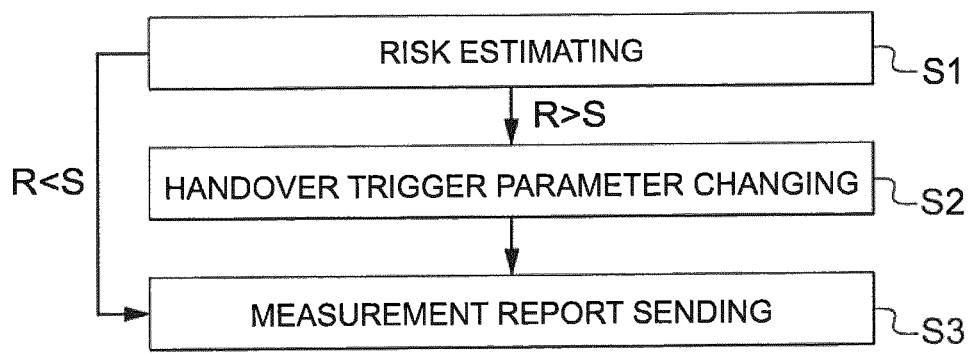
FIG. 3 shows the steps of an example of a method of controlling handover by a user equipment according to some embodiments of the invention.

FIG. 3 shows the steps of an example of a method controlling by a user equipment handover according to some embodiments of the invention. This method of evaluating by a user equipment a need for handover between cells in a cellular network, comprises several steps, a step of estimating a risk S1, a step of handover trigger parameter changing S2, a step of measurement report sending S3.

After a handover failure, in step S1, the user equipment itself estimates a risk R of making an ineffective handover. This ineffective handover may be a handover failure or a ping pong handover. At end of step S1 the estimated risk R is compared to a threshold S. To check if estimated risk R is above or below the threshold S, step S1 preferably includes a substep of counting the number of ineffective handovers and a substep of comparing said counted number to a threshold. If estimated risk R is below the threshold S, then method goes to step S3. If estimated risk R is above the threshold S, then method goes to step S2.

In step S2, when said estimated risk R is above the threshold S, the value of at least one handover trigger parameter is changed so as to make harder, for given handover attractiveness parameters respectively received from base stations of cells, the handover trigger conditions to be met by user equipment. The handover attractiveness parameters are the power levels, received by user equipment, respectively coming from base station of cells, at least from base station of present cell which is the serving cell of user equipment and from base station of an adjacent cell which is a target cell for a handover for this user equipment. The ineffective handover may be a failed handover or a ping pong handover. At least one changed handover trigger parameter is the Time To Trigger parameter and/or at least one changed handover trigger parameter is the handover Power Hysteresis: one specific way of changing both handover trigger parameters will be detailed with respect to FIG. 4 in some embodiments. At least one handover trigger parameter, Power Hysteresis and/or Time To Trigger, is or are increased. Before being changed, the original values of these handover trigger parameters had been received from cellular network.

In step S3, the measurement report is sent to base station of network by the user equipment. This measurement report sanding has been triggered either with unchanged handover trigger parameters when preceding step was step S1 or with changed handover trigger parameters when preceding step was step S2.

In a specific implementation mode, each couple of neighbor cells around user equipment is treated separately and independently from other couples of neighbor cells. So, when a specific couple of cells is considered, for example the respective attractiveness of a given target cell relatively to a present cell for a given user equipment, the steps of the method of evaluating by a user equipment a need for handover from a given present cell to a given target cell in a cellular network, are modified the following way. In step S1, the estimated risk is an estimated risk of making an ineffective handover from this present cell to this target cell. In step S2, the value of at least one handover trigger parameter is changed so as to make harder to be met, for given handover attractiveness parameters respectively received from base station of this present cell and base station of this target cell, the handover trigger conditions only from this present cell to this target cell to be made by user equipment.

Figure 4:
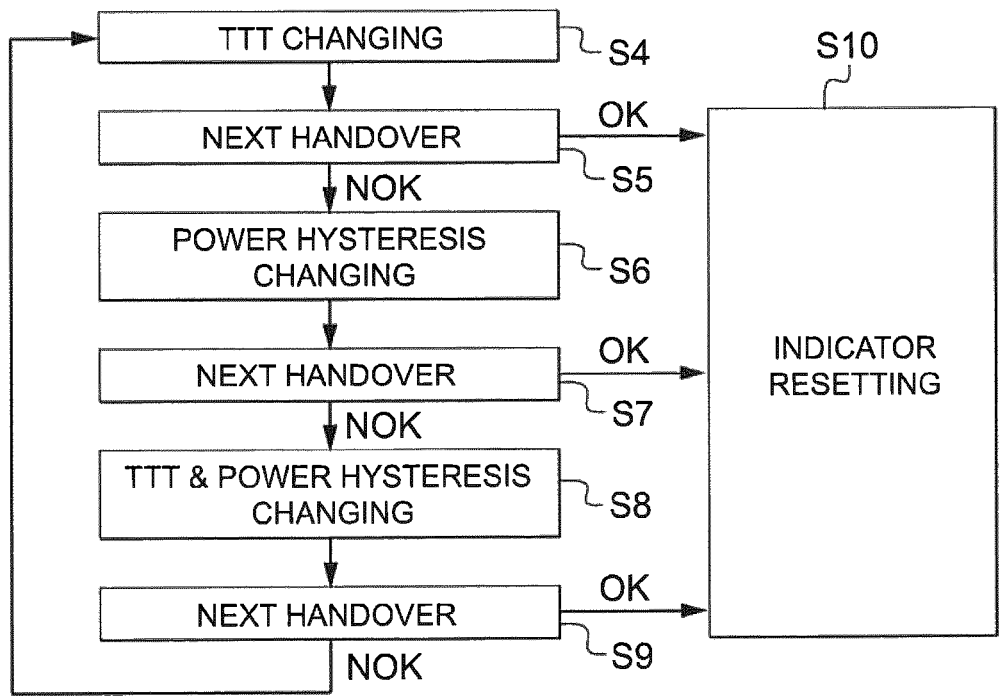
FIG. 4 shows the substeps of an example of successive performances of a handover trigger parameter changing step of a method controlling by a user equipment handover according to some embodiments of the invention.

FIG. 4 shows the substeps of an example of successive performances of a handover trigger parameter changing step of a method controlling by a user equipment handover according to some embodiments of the invention, each performance depending on the result of the next handover, if the next handover performed the handover trigger parameter changed was effective or not. Here, both handover trigger parameters may be changed, depending on circumstances. Changing step S2 may be indeed performed several times, each time in a different way. Performance of changing step S2 may include a first substep S4 of changing the value of the Time To Trigger parameter, a substep of performing next handover S5, a second substep S6 of changing the value of the handover Power Hysteresis, a substep of performing next handover S7, a third substep S8 of changing both the values of the Time To Trigger parameter and of the handover Power Hysteresis, a substep of performing next handover S9, a substep of resetting indicator S10.

More generally speaking, the indicator may be reset to zero, each time a handover trigger parameter has resulted in a next handover that was effective.

In substep S4, the value of the Time To Trigger parameter is changed. Then in substep S5, next handover is performed, after having sent corresponding measurement report in a step S3 described in FIG. 3, like before any handover performance. Either this next handover is successful or not. If this next handover is successful then the method goes to substep S10. If this next handover is not successful then the method goes to substep S6.

In substep S6, the value of the Power Hysteresis parameter is changed, with getting back to original value of the Time To Trigger parameter. Then in substep S7, next handover is performed. Either this next handover is successful or not. If this next handover is successful then the method goes to substep S10. If this next handover is not successful then the method goes to substep S8.

In substep S8, the value of the Time To Trigger parameter as well as the value of the Power Hysteresis parameter are both changed, that is the value of the Time To Trigger parameter of substep S4 is taken while the value of the Power Hysteresis of substep S6 is taken. Then in substep S9, next handover is performed. Either this next handover is successful or not. If this next handover is successful then the method goes to substep S10. If this next handover is not successful then the method goes back to substep S4 to further increment the Time To Trigger parameter.

In substep S10, one of the just described "next handovers" has been successful, which means there is again favorable conditions for performing handover from present cell to target cell, with a low probability that a future handover results in an ineffective handover. Then, the concerned indicator, whether it is the "handover failure" indicator or the "ping pong handover" indicator, can be reset to zero.

In second prior art, there were some lacks to involve user equipment in the decision to make handover, in order to optimize handover key performance indicators of network and to get a better Quality of Service related to telecom services like delay or throughput. With some embodiments of the invention, the introduction of an online self-optimizing algorithm in user equipment side that will tune the handover trigger parameters itself, will lead to a better overall network performance and to a user Quality of Service improvement.

Figure 5:
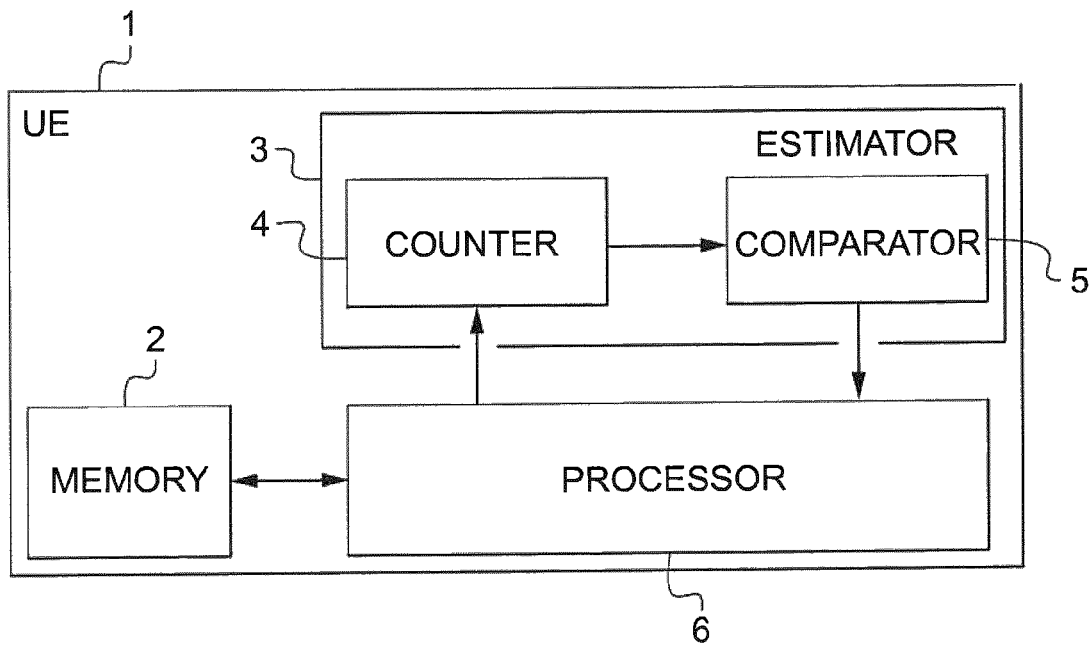
FIG. 5 shows an example of a user equipment adapted to implement a method controlling handover according to some embodiments of the invention.

FIG. 5 shows an example of a user equipment adapted to implement a method controlling handover according to some embodiments of the invention. The user equipment described in FIG. 5 may be used to implement the controlling method described with respect to FIGS. 1 to 4, as well as the controlling method that will be described with respect to FIGS. 6 to 8. The user equipment 1 of a cellular network comprises a memory 2, an estimator 3, itself comprising a counter 4 and a comparator 5, and a processor 6.

The memory 2 is adapted to store at least one handover trigger parameter, Time To Trigger parameter and/or Power Hysteresis parameter. The estimator 3 is adapted to estimate a risk of making a failed handover and/or a risk of making a ping pong handover. The counter 4 of estimator 3 is adapted to count, since last successful handover, number of past failed handovers and/or number of past ping pong handovers. The comparator 5 of estimator 3 is adapted to compare this number to a threshold, this risk being above a given threshold if this number is above this threshold and this risk being below this threshold if this number is below this threshold. The processor 6 is adapted, when this estimated risk or at least one of these estimated risks is above a given threshold, to trigger in memory 2 an adjustment (e.g. an increase) of the value of the stored handover trigger parameter. The processor 6 is also adapted to reset the value of the stored handover trigger parameter when needed, for example when a next handover has resulted in an effective handover.

The user equipment would preferably implement both the Time To Trigger parameter and the Power Hysteresis parameter. When ineffective handover rate gets above a fixed threshold written, for example, in the user equipment memory 2 (this fixed threshold being given by network operator), it becomes interesting to perform an optimization of one of these handover trigger parameters, and especially interesting to perform this optimization on user equipment side. Instead of a fixed threshold, a threshold chosen by the user equipment may be used, or a threshold automatically adapting to some changing network parameters.

Figure 6:
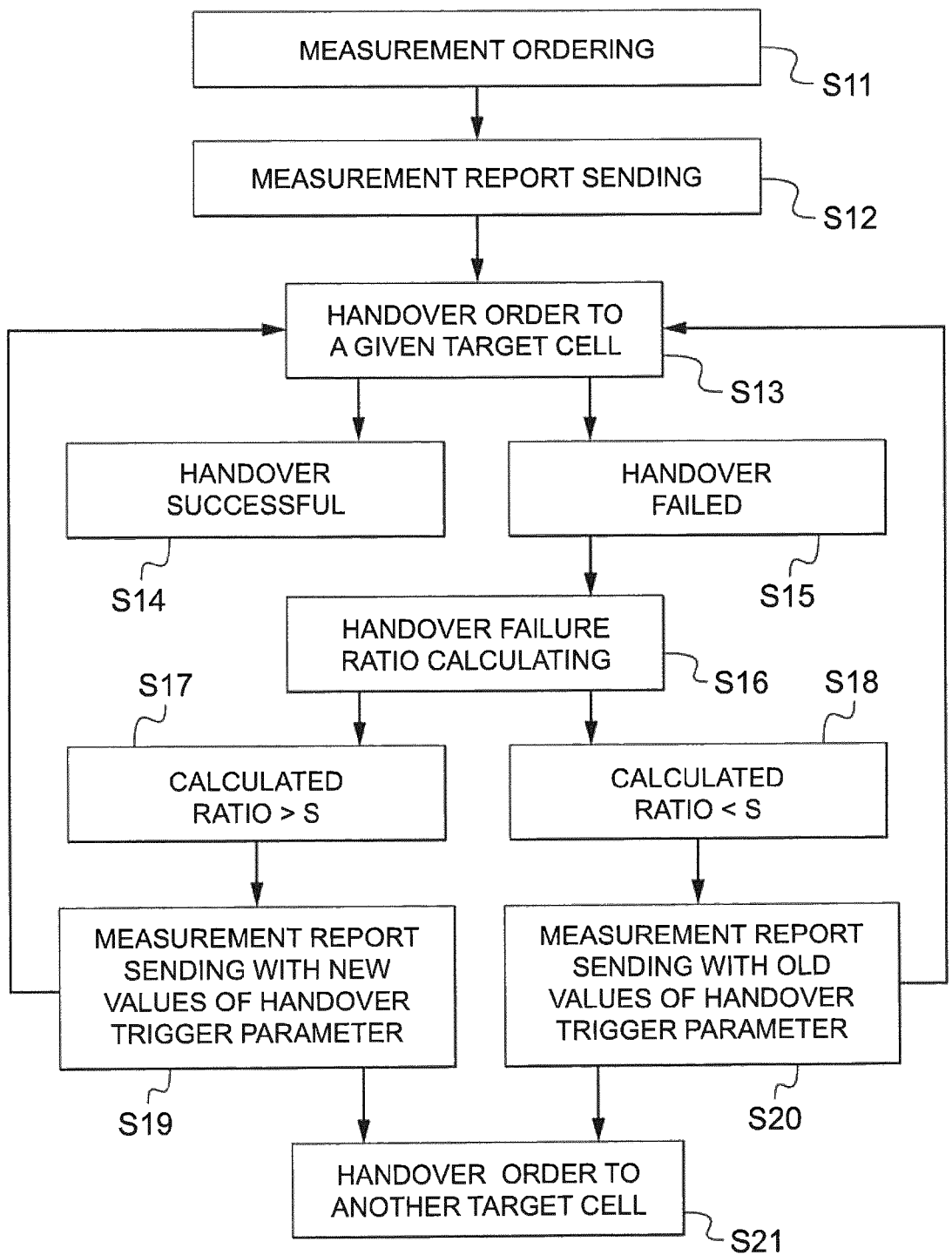
FIG. 6 shows the steps of an example of a method controlling by a user equipment handover according to some embodiments of the invention, with respect to the handover failure rate.

FIG. 6 shows the steps of an example of a method controlling by a user equipment handover according to some embodiments of the invention, with respect to the handover failure rate. The handover failure rate is the rate of the number of failed handovers to the number of handover attempts. The number of handover attempts is the sum of the number of successful and the number of failed handovers. The handover failure is mainly related to the power of target cell and the user equipment capacity to find it. So, to lower this handover failure rate, user equipment can increase the Time To Trigger parameter and/or the Power Hysteresis. An interesting main target of cellular network may be to reduce the number of handovers that are initiated but not carried out to completion. Of course a trade-off has to found, since too high values of handover trigger parameters during a too long duration will result in handover conditions being never met or to rarely met so that the connection between the user equipment and the base station of the serving cell will be often lost before any handover had a chance to occur.

This controlling method includes a measurement ordering step S11, a measurement report sending step S12, a handover order to a given target cell step S13, a handover successful step S14, a handover failed step S15, a handover failure rate calculating step S16, a calculated rate above a threshold step S17, a calculated rate below a threshold step S18, a measurement report sending with new values of handover trigger parameter step S19, a measurement report sending with old values of handover trigger parameter step S20, a handover order to another target cell step S21. This controlling method is performed in the case where each couple of present and target cells is considered separately and independently. TTT is Time To Trigger parameter whereas H is Power Hysteresis parameter. A given user equipment is in a present cell X of a cellular network and communicates to base station of this present cell X which is its serving cell. For this given equipment there is a potential handover to neighbor cells of cellular network which are target cells Y and Z. The considered couple of present and target cells is the couple constituted of cells X and Y.

In step S11, user equipment is in connected mode in present cell X. Base station orders user equipment to make measurement for target cell Y using TTT and H values given by base station. The method goes to step S12.

In step S12, user equipment sends a measurement report to base station while respecting TTT and H values given by base station. The method goes to step S13.

In step S13, base station orders user equipment to try a handover from present cell X to target cell Y. Either this handover is successful and the method goes to step S14 or this handover is unsuccessful and the method goes to step S15.

In step S14, user equipment tries to make the handover from present cell X to target cell Y and this handover is successful. If there is a non null handover failure rate for the handover attempts done from present cell X to target cell Y, user equipments resets this rate to zero.

In step S15, user equipment tries to make the handover from present cell X to target cell Y and this handover try is a failure. The method goes to step S16. In the same time, user equipment sends a handover failure indication to base station.

In step S16, user equipment updates the handover failure rate by calculating the new handover failure rate. This handover failure rate only takes into account the handover attempts done from present cell X to target cell Y. Either this handover failure rate is above a fixed predetermined threshold and the method goes to step S17 or this handover failure rate is below a fixed predetermined threshold and the method goes to step S18. Several options are contemplated. Either the handover failure rate is reset after each effective handover and the handover failure rate is a simple handover failure count, or a more stringent condition is needed to trigger the handover failure rate reset, like a minimum number of effective handovers without handover failure, for example two or three. In that last case, not only handover failures are counted, but also effective handovers.

In step S17, user equipment detects that the handover failure rate is above the fixed threshold. The method goes to step S19.

In step S18, user equipment detects that the handover failure rate is below or equal to the fixed threshold. The method goes to step S20.

In step S19, user equipment sends a measurement report to base station for a handover to target cell Y using the new TTT and/or H values calculated by user equipment.

In step S20, user equipment sends a measurement report to base station for a handover to target cell Y respecting the old TTT and/or H values either previously given by base station or calculated by user equipment in a preceding iteration. Steps S19 and S20 are performed in a similar way to step S12.

Either at the end of step S19 or S20, the method either goes back to step S13 or goes to step 21, not depending on TTT and/or H values variation, but depending on other parameters known on the network side, for example the respective traffic loads of the different neighbor cells. To avoid that there is a perpetual cycling from step S13 to step S15 to step S16 to steps S17 or S18 to steps S19 or S20 and then back to step S13, such routine can be interrupted. Such interruption may be either a maximal number of cycles, for example two or three, or maximal values of TTT and/or H, for example 5120 ms and/or 30 dB.

In step S21, base station order user equipment to try a handover from cell X to cell Z. User equipment then resets non null handover failure rate to zero, but only for the handover attempts done from cell X to cell Y (in case of this couple of neighbor cells (X, Y) is treated separately and independently from other couples of neighbor cells). When this controlling method is performed in the case where the handover failure rate is considered simultaneously for all couples of present and target cells, in step S21, the non null handover failure rate is not reset to zero.

When user equipment goes from connected mode to idle mode, the handover failure rate will be automatically reset to zero.

Figure 7:
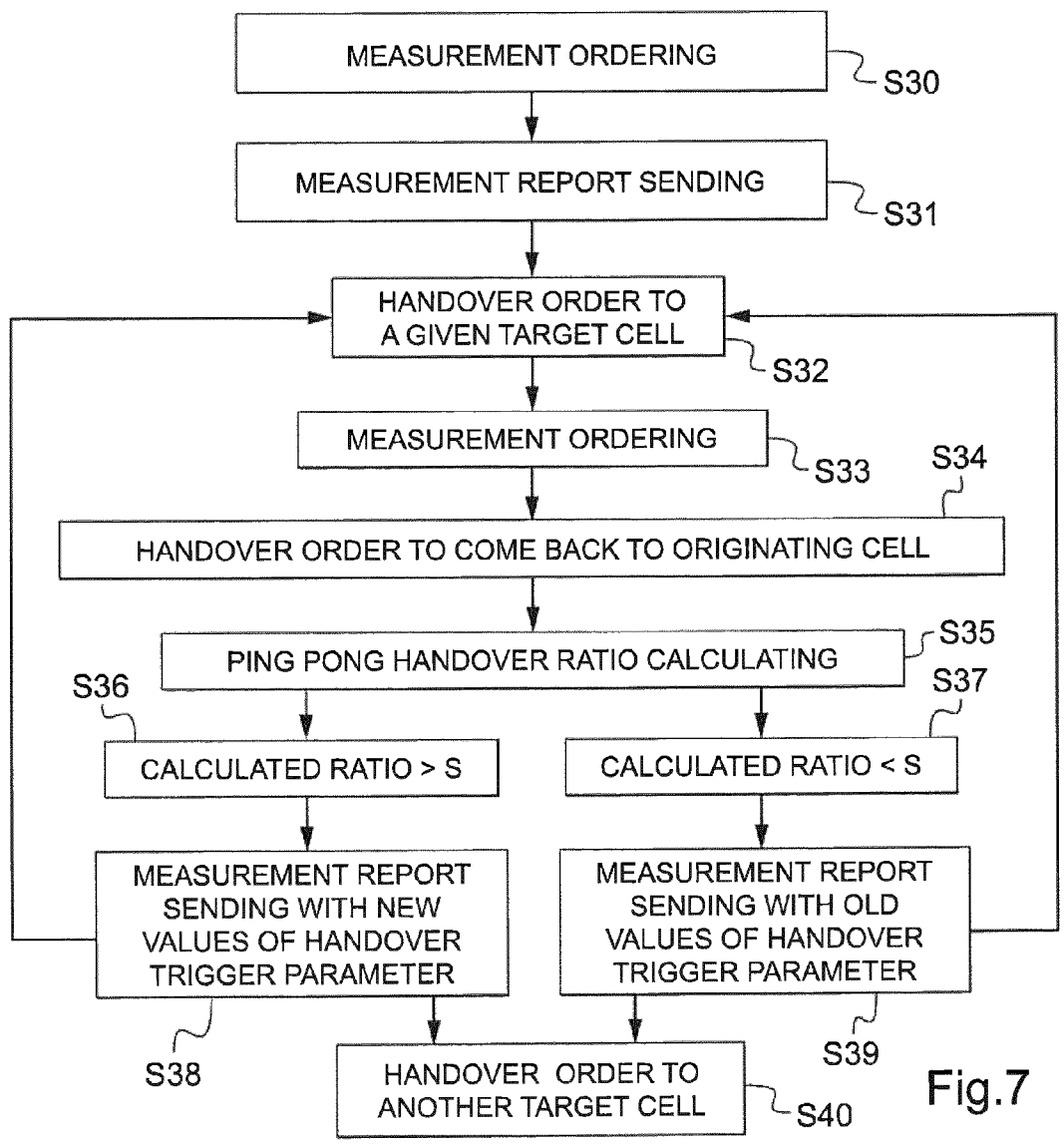
FIG. 7 shows the steps of an example of a method controlling by a user equipment handover according to some embodiments of the invention, with respect to the ping pong handover rate.

FIG. 7 shows the steps of an example of a method controlling by a user equipment handover according to some embodiments of the invention, with respect to the ping pong handover rate. If a call is handed over to a new cell and is handed back to the source cell in a small time, this handover is considered to be a ping-pong handover. The ping-pong handover is also mainly related to the power of target cell. So, to lower ping-pong handover rate, user equipment can increase the Time To Trigger parameter and/or the Power Hysteresis. Another interesting main target of cellular network may be to reduce the number of handovers that are repeated back and forth handovers between two base stations. Of course a trade-off has to found, since too high values of handover trigger parameters during a too long duration will result in handover conditions being never met or to rarely met so that the connection between the user equipment and the base station of the serving cell will be often lost before any handover had a chance to occur.

This controlling method includes a measurement ordering step S30, a measurement report sending step S31, a handover order to a given target cell step S32, a possible measurement ordering and sending step S33, a handover order to come back to originating cell step S34, a ping pong handover rate calculating step S35, a calculated rate above a threshold step S36, a calculated rate below a threshold step S37, a measurement report sending with new values of handover trigger parameter step S38, a measurement report sending with old values of handover trigger parameter step S39, a handover order to another target cell step S40. This controlling method is performed in the case where each couple of present and target cells is considered separately and independently. TTT is Time To Trigger parameter whereas H is Power Hysteresis parameter. A given user equipment is in a present cell X of a cellular network and communicates to base station of this present cell X when it is its serving cell or to base station of the target cell Y when it is its serving cell. For this given equipment there is a potential handover to neighbor cells of cellular network which are target cells Y and Z. The considered couple of present and target cells is the couple constituted of cells X and Y.

In step S30, user equipment is in connected mode in present cell X. Base station of cell X orders user equipment to make measurement for target cell Y using TTT and H values given by base station of cell X. The method goes to step S31.

In step S31, user equipment sends a measurement report to base station of cell X while respecting TTT and H values given by base station. The method goes to step S32.

In step S32, base station of cell X orders user equipment to try a handover from present cell X to target cell Y. If this handover is successful, user equipment goes to target cell Y which becomes its serving cell, and the method goes to step S33. If the handover is not successful, a handover failure occurs.

In step S33, user equipment is in connected mode in serving cell Y. Base station of serving cell Y orders user equipment to make a measurement for cell X. The method goes to step 34. After step S33, before going to step 34, user equipment sends a measurement report to base station of cell X while respecting TTT and H values given by base station.

In step S34, base station of serving cell Y orders user equipment to try a handover from serving cell Y back to cell X, e.g. because radio condition in cell Y is unstable and changes with very fast manner from good to drastically bad. User equipment stay in cell Y is very short compared to a fixed duration threshold which is used to detect the ping pong behavior Duration threshold can be fixed for example by the telecom operator. User equipment succeeds to make the handover from serving cell Y back to cell X. The method goes to step S35.

In step S35, user equipment is now again in cell X which is again its serving cell. User equipment updates the ping pong handover rate by calculating the new ping pong handover rate. This ping pong handover rate only takes into account the handover attempts done from cell X to cell Y. Either this ping pong handover rate is above a fixed predetermined threshold and the method goes to step S36 or this ping pong handover rate is below a fixed predetermined threshold and the method goes to step S37. Next effective handover may trigger ping pong handover rate reset. Several options are contemplated. Either the ping pong handover rate is reset after each effective handover and the ping pong handover rate is a simple ping pong handover count, or a more stringent condition is needed to trigger the ping pong handover rate reset, like a minimum number of effective handovers without ping pong handover, for example two or three. In that last case, not only ping pong handovers are counted, but also effective handovers.

In step S36, user equipment detects that the ping pong handover rate is above the fixed threshold. The method goes to step S38.

In step S37, user equipment detects that the ping pong handover rate is below or equal to the fixed threshold. The method goes to step S39.

In step S38, user equipment sends a measurement report to base station of cell X for a handover to target cell Y using the new TTT and/or H values calculated by user equipment.

In step S39, user equipment sends a measurement report to base station of cell X for a handover to target cell Y respecting the old TTT and/or H values either previously given by base station of serving cell or calculated by user equipment in a preceding iteration.

Either at the end of step S38 or S39, the method either goes back to step S32 or goes to step 40, not depending on TTT and/or H values variation, but depending on other parameters known on the network side, for example the respective traffic loads of the different neighbor cells. To avoid that there is a perpetual cycling from step S32 to step S33 to step S34 to step 35 to steps S36 or S37 to steps S38 or S39 and then back to step S32, such routine can be interrupted. Such interruption may be either a maximal number of cycles, for example two or three, or maximal values of TTT and/or H, for example 5120 ms and/or 30 dB.

In step S40, base station of cell X orders user equipment to try a handover from cell X to cell Z. User equipment then resets non null ping pong handover rate to zero, but only for the handover attempts done from cell X to cell Y (in case of this couple of neighbor cells (X, Y) is treated separately and independently from other couples of neighbor cells). When this controlling method is performed in the case where the ping pong handover rate is considered simultaneously for all couples of present and target cells, in step S40, the non null ping pong handover rate is not reset to zero.

When user equipment goes from connected mode to idle mode, the ping pong handover rate will be automatically reset to zero.

Figure 8:
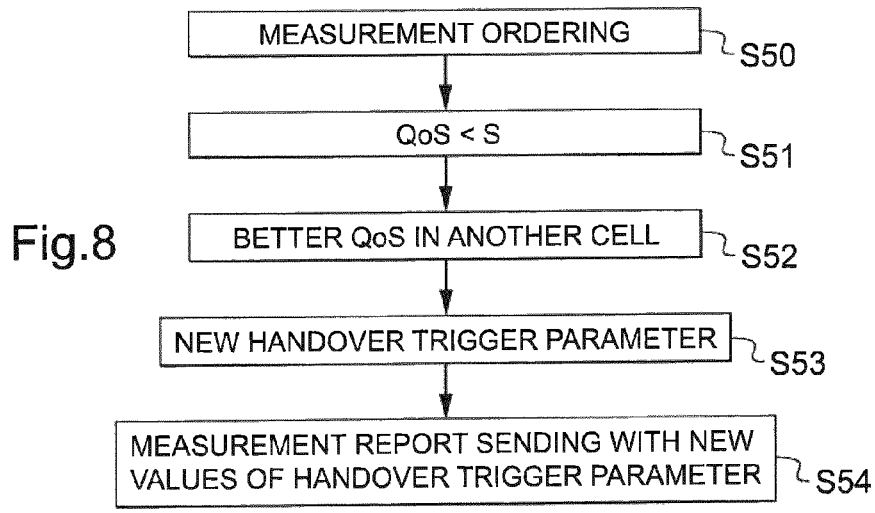
FIG. 8 shows other steps which can be performed by a method controlling by a user equipment handover according to some embodiments of the invention.

FIG. 8 shows other steps which can be performed by a method controlling by a user equipment a need for handover according to some embodiments of the invention. According to some embodiments of the invention the controlling method may include a step of Quality of Service estimation for a cell which is a target cell for handover, followed, when said estimated Quality of Service is above a threshold, by a step of changing the value of at least one handover trigger parameter of user equipment so as to accelerate the handover to this target cell rate.

More particularly, the controlling method may include successively a step S50 of measurement ordering, a step S51 of comparing measured Quality of Service to a fixed threshold, and if measured Quality of Service is below the fixed threshold, a step S52 of detecting better Quality of Service in another neighbor cell, a step S53 of calculating a new handover trigger parameter, a step S54 of sending a measurement report to base station of cell X using the new values of handover trigger parameter(s).

In step S50, user equipment is in connected mode in present serving cell X. A multimedia service execution, like for example data transfer, is on going. Base station of cell X orders user equipment to make a measurement for cell Y using TTT and H values given by base station of cell X.

In step S51, the application layer of user equipment detects that Quality of Service parameters regarding the service executed at this time, is below one or more fixed thresholds. For example, data transfer throughput is below a fixed threshold. Application layer of user equipment informs Radio Resource Control of user equipment about this situation.

In step S52, Radio Resource Control of user equipment detects that target cell Y, for which base station of cell X has ordered to make measurements, can offer better Quality of Service than present serving cell X. For example, target cell Y has better Reference Signal Received Power (RSRP) and better Reference Signal Received Quality (RSRQ) than present serving cell X.

In step S53, Radio Resource Control of user equipment sets new TTT and/or H values.

In step S54, user equipment sends a measurement report, to base station of present serving cell X, for a handover to target cell Y using new TTT and/or H values calculated by Radio Resource Control of user equipment. Here, one purpose of the steps S50 to S54 may be to accelerate handover to target cell Y which at present can offer a higher Quality of Service than the Quality of Service that can be offered by present serving cell X.

Here, when the power of present cell, which is the serving cell, is reduced so that Quality of Service of telecom service, for example throughput and latency, is deteriorated with these bad radio conditions, and user equipment finds a better neighbor cell with higher power which can be used to continue the execution of telecom service with a better Quality of Service, for example less Cyclic Redundancy Check errors and higher throughput, the user equipment has the capability to act to accelerate the handover to this better cell.

To accelerate the handover to this better target cell, which offers better radio conditions compared to the present serving cell, user equipment can decrease the Time To Trigger parameter and/or the Power Hysteresis. This way, measurement report message will be sent earlier to the network and in turn the network will also instruct earlier the user equipment, in order to start the handover procedure. Handover acceleration procedure may be triggered for example by Radio Resource Control module of user equipment because this module has all information related to radio conditions on present cell, the serving cell, and on neighbors cells which may all be potentially target cells for handover.

In a numerical example of the global controlling method according to some embodiments of the invention, when increasing handover trigger parameter, if the TTT value given by network is 40 ms, user equipment increases it to become 64 ms. So, at each time, the user equipment simply takes the value just superior to the one given by network, in a predetermined table. Same thing can be done for Power Hysteresis value. When the user equipment needs on the contrary to decrease the TTT value, user equipment takes the value just inferior to the one given by network. Of course, when the TTT value given by network is zero, the new TTT value in case of TTT decrease will be zero too.

Variations of TTT values are given in following table 1.

TABLE 1

| TTT given by network in ms | New TTT value in case of TTT already increased by user equipment in ms | New TTT value in case of TTT already decreased by user equipment in ms |
| --- | --- | --- |
| 0 | 40 | 0 |
| 40 | 64 | 0 |
| Etc . . . | Etc . . . | Etc . . . |
| 2560 | 5120 | 1280 |
| 5120 | 5120 | 2560 |

Variations of Power Hysteresis values are given in following table 2.

TABLE 2

| Power Hysteresis given by network in dB | New Power Hysteresis value in case of TTT already increased by user equipment in dB | New Power Hysteresis value in case of TTT already decreased by user equipment in dB |
|---|---|---|
| 0 | 1 | 0 |
| 1 | 2 | 0 |
| Etc ... | Etc ... | Etc ... |
| 29 | 30 | 28 |
| 30 | 30 | 29 |

The invention has been described with reference to preferred embodiments. However, many variations are possible within the scope of the invention.

The invention claimed is:

1. A method for a user equipment controlling handover between cells in a cellular network, the method comprising:
   estimating, by the user equipment, a risk of an ineffective handover for the user equipment; and
   when said estimated risk is above a threshold, changing, by the user equipment, value of at least one handover trigger parameter for the user equipment to reduce a future risk of an ineffective handover by the user equipment,
   wherein said changing includes
   changing a value of a Time To Trigger parameter;
   if said changing of the value of the Time To Trigger parameter does not lead to a next effective handover for the user equipment, changing a value of a handover Power Hysteresis parameter;
   if said changing the value of the handover Power Hysteresis parameter does not lead to a next effective handover for the user equipment, changing both the value of the Time To Trigger parameter and the value of the handover Power Hysteresis parameter.

2. The method according to claim 1, wherein said estimating includes counting ineffective handovers by the user equipment, and comparing the counted number of ineffective handovers by the user equipment to a number threshold.

3. The method according to claim 1, wherein an ineffective handover is a failed handover or a ping pong handover.

4. The method according to claim 1, wherein, said changing includes increasing one of the at least one said handover trigger parameter.

5. The method according to claim 1, further comprising:
   receiving said at least one handover trigger parameter from the cellular network before being changed.

6. The method according to claim 1, wherein said controlling method also comprises:
   estimating a Quality of Service for a target cell for handover; and
   when said estimated Quality of Service is above a Quality of Service threshold, said changing of the value of at least one handover trigger parameter of user equipment is performed so as to accelerate the handover to this target cell.

7. The method of claim 6, wherein said estimated Quality of Service is a throughput, and/or said changing of the value of at least one handover trigger parameter decreases the value.

8. The method according to claim 1, wherein said controlling method also comprises:
   estimating a Quality of Service for a target cell for handover and for a serving cell; and
   when difference between said estimated Quality of Service for said target cell and said estimated Quality of Service for said serving cell is above a difference threshold, said changing of the value of at least one handover trigger parameter of user equipment is performed so as to accelerate the handover to this target cell.

9. The method of claim 8, wherein said changing of the value of at least one handover trigger parameter decreases the value.

10. A non-transitory computer readable medium storing thereon a computer program comprising program instructions, the computer program being loadable into a data-processing unit and causing execution of the method according to claim 1 when the computer program is run by the data-processing unit.

11. A method for a user equipment controlling handover from a given present cell to a given target cell in a cellular network, the method comprising:
   estimating, by the user equipment, a risk of an ineffective handover for the user equipment from said present cell to said target cell, and
   when said estimated risk is above a threshold, changing, by the user equipment, value of at least one handover trigger parameter for the user equipment to reduce a future risk of an ineffective handover by the user equipment,
   wherein said changing includes
   changing a value of a Time To Trigger parameter;
   if said changing of the value of the Time To Trigger parameter does not lead to a next effective handover for the user equipment, changing a value of a handover Power Hysteresis parameter;
   if said changing the value of the handover Power Hysteresis parameter does not lead to a next effective handover for the user equipment, changing both the value of the Time To Trigger parameter and the value of the handover Power Hysteresis parameter.

12. A user equipment of a cellular network, the user equipment comprising:
   a memory configured to store at least one handover trigger parameter for the user equipment;
   an estimator configured to estimate a risk of a failed handover for the user equipment and/or a risk of making a ping pong handover for the user equipment; and
   a processor configured to trigger in said memory a change of a value of said stored handover trigger parameter when said estimated risk or at least one of said estimated risks is above a threshold,
   wherein said change includes
   changing a value of a Time To Trigger parameter;
   if said changing of the value of the Time To Trigger parameter does not lead to a next effective handover for the user equipment, changing a value of a handover Power Hysteresis parameter;
   if said changing the value of the handover Power Hysteresis parameter does not lead to a next effective handover for the user equipment, changing both the value of the Time To Trigger parameter and the value of the handover Power Hysteresis parameter.

13. The user equipment according to claim 12, wherein said estimator comprises:

at least one counter configured to count past failed handovers by the user equipment and/or past ping pong handovers by the user equipment since a last effective handover, and a comparator configured to compare the count to a number threshold, at least one of said risk being above said threshold if said number is above said number threshold and at least one of said risk being below said threshold if said number is below said number threshold.

14. The user equipment according to claim 12, wherein:
the estimator is also adapted to estimate a Quality of Service for a cell which is a target cell for handover, and the processor is also adapted, when said estimated Quality of Service is above a Quality of Service threshold, to trigger in said memory a change of the value of said stored handover trigger parameter so as to accelerate the handover to this target cell.

15. The user equipment of claim 14, wherein said Quality of Service is throughput, and/or said change is a decrease of the value of said stored handover trigger parameter.

16. The user equipment according to claim 12, wherein the user equipment is a communication device.

17. The user equipment of claim 12, wherein the processor said change of the value is an increase of the value.

18. An arrangement for a user equipment of a cellular network, the arrangement comprising:
a memory configured to store a handover trigger parameter which is a Power Hysteresis, an estimator configured to estimate a variation of a handover measurement parameter between said user equipment and a base station of at least a cell, and a processor configured to trigger, in said memory, a change of a value of said Power Hysteresis, when said estimated variation is above a threshold, wherein said change includes changing a value of a Time To Trigger parameter;

if said changing of the value of the Time To Trigger parameter does not lead to a next effective handover for the user equipment, changing a value of the Power Hysteresis parameter;

if said changing the value of the Power Hysteresis parameter does not lead to a next effective handover for the user equipment, changing both the value of the Time To Trigger parameter and the value of the Power Hysteresis parameter.

* * * * *